United States Patent Office 2,908,642
Patented Oct. 13, 1959

2,908,642

TREATMENT OF UNDERGROUND FORMATIONS

William E. Thompson, Wallingford, and Francis A. Boyle, Norwood, Pa., assignors to Sun Oil Company, Philadelphia, Pa., a corporation of New Jersey No Drawing. Application May 2, 1956
Serial No. 582,081

7 Claims. (Cl. 252—8.55)

This invention relates to the treatment of petroleum-bearing underground formations for the purpose of facilitating the flow of hydrocarbons from the formation into a production well. More particularly, the invention is concerned with the use of aliphatic diamines for treating formations to improve the flow of hydrocarbons therethrough while hindering the flow of water.

It has been proposed heretofore to treat oil bearing sands with various aliphatic monoamines to facilitate the production of oil from the formation. It is thought that beneficial effects are obtained by such treatment due to chemisorption of the amine on the sand surfaces, whereby the sand is rendered oleophilic or preferentially wettable by oil. This permits the oil to flow more freely through the formation while hindering the flow of water. Amine compounds which have been proposed for this purpose have been monoamines of relatively high molecular weight. The adsorbed amine molecules are thought to provide relatively large hydrocarbon groups that can function to alter the nature of the sand surface, converting it from hydrophilic to oleophilic character. Amines heretofore proposed include such compounds as decylamine, hexadecylamine, dioctylamine, octadecylamine, lauryl dimethylamine and docosylamine. These compounds are soluble in hydrocarbons and can be introduced into the formation in the form of a solution in a suitable hydrocarbon material, such as kerosene, diesel oil or crude oil.

While monoamines are capable of rendering sands preferentially wettable by oil, the effect of the treatment is more or less temporary. After a well is put back into production following treatment of the formation, the flow of oil through the sands tends to desorb and release the amine molecules from the surfaces. This tends to convert the sand back to its natural hydrophilic state, whereby the flow of oil is retarded and the flow of water through the sand is facilitated.

An object of the present invention is to provide a treatment for petroleum-bearing formations which will have a more lasting effect in improving the permeability of the sand to hydrocarbons. According to the invention, the formation is treated with an aliphatic diamine of 2 to 12 carbon atoms and having its two amino groups attached to different carbon atoms at least one of which is a terminal carbon atom. Such compounds, due to the presence of the two amino groups in each molecule, become more permanently affixed to the surface of the sand and thus have a more permanent effect in rendering the sand oleophilic. Following the treatment with a diamino compound according to the invention, the well can be maintained in production for longer periods of time with improved results than is possible when the treatment is done by utilizing amine compounds heretofore proposed.

In practicing the present process, it is preferred to use straight-chain diamines, although branched-chain diamines are within the scope of the invention. One of the amino groups must be attached to a terminal carbon atom and the other may be attached to another terminal carbon atom or to an intermediate carbon atom. Either saturated or unsaturated aliphatic amines may be utilized. Examples of diamines which may be employed are ethylene diamine, trimethylene diamine, 1,3-diamino butane, 1,2-diamino hexane, 1,4-diamino octane, decamethylene diamine and the like. The lower molecular weight diamines are preferred for practicing the invention, since they offer the advantage of being water soluble so that they will more readily dissolve in and diffuse through water films or channels in the formation and thus more effectively contact the surfaces of the sand.

The treatment of an oil well according to the invention may be carried out by dissolving a minor amount of one or more of the diamines as specified above in a suitable solvent, such as kerosene, gas oil, crude oil, alcohol, acetone or the like, and introducing the solution through the borehole into the formation. Only a small proportion, e.g. less than 5% of the diamine need be used in the solution for good results, although larger proportions may be employed if desired. Generally it is preferable that the amount of diamine in the treating solution be within the range of 0.05–2.0% by weight, since it has been found that such small proportions can effectively and economically be employed to achieve the desired results. As the solution of treating agent flows from the borehole into the formation being treated, the diamine contacts the sand surfaces by direct contact of the diamine solution therewith or by dissolution of the diamine from the treating solution into water films or channels and diffusion therethrough to the sand surfaces. Adsorption of the diamine on the sand changes the character of the surfaces and renders them oleophilic. When the well is subsequently put back into operation, the oil can pass more readily through the treated zone whereas the flow of water from farther back in the formation toward the borehole is retarded. The treatment thus effects a prolonged increase in the ratio of oil to water produced from the well.

The following example, which is illustrative of the invention, shows the effectiveness of 1,3-diamino butane in treating sand. In this example a specially designed flow cell for holding a silica core and flowing through it a hydrocarbon phase and a brine phase simultaneously under standardized constant head conditions was employed. The silica core was made by compressing finely divided silica under a pressure of about 10,000 p.s.i.g. to form a core of about ¾" I.D. and 2½" length. Kerosene and brine initially were fed to the core under the constant head conditions; and it was found that the permeabilities of the core to the kerosene and to the brine were 1.2 and 3.0 millidarcies, respectively. The ratio of kerosene to water passing through the core was 0.23 to 1. The core was then treated by continuing the two phase flow but substituting for the plain kerosene a kerosene solution containing 0.10% of 1,3-diaminobutane. It was found that the permeability with respect to the hydrocarbon phase increased during the treatment to about 4.5 millidarcies while that with respect to brine decreased to 1.0 millidarcy. Thereafter the simultaneous flows of kerosene without the diamine treating agent and of brine were continued for ten days during which time the permeability with respect to kerosene had increased still further to about 6.0 millidarcies while that with respect to brine had decreased still further to 0.5 millidarcy. At the end of this time the ratio of kerosene to brine passing through the core was about 8 to 1. These results show that the treatment produces a prolonged improvement in the relative flow of hydrocarbons and brine through the sand.

We claim:

1. Method of facilitating the flow of hydrocarbons from an underground formation containing hydrocarbons and water which comprises treating the formation with an aliphatic diamine in which each nitrogen group is primary, said diamine having 2–12 carbon atoms per molecule and having at least one amino group attached to a terminal carbon atom, the amount of aliphatic diamine being sufficient to render surfaces of the formation oleophilic and increase the hydrocarbon permeability of the formation.

2. Method of treating an oil bearing formation containing water to facilitate the flow of oil which comprises introducing into the formation a hydrocarbon solution containing a minor amount of an aliphatic diamine in which each nitrogen group is primary, said diamine having 2–12 carbon atoms per molecule and having at least one amino group attached to a terminal carbon atom, the amount of aliphatic diamine being sufficient to render surfaces of the formation oleophilic and increase the hydrocarbon permeability of the formation.

3. Method according to claim 2 wherein said diamine is water soluble.

4. Method according to claim 3 wherein said diamine is 1,3-diaminobutane.

5. Method of treating an oil bearing formation containing water to facilitate the flow of oil which comprises introducing into the formation a hydrocarbon solution containing 0.05–5.0% of an aliphatic diamine in which each nitrogen group is primary, said diamine having 2–12 carbon atoms per molecule and having at least one amino group attached to a terminal carbon atom.

6. Method according to claim 5 wherein said diamine is water soluble.

7. Method of treating an oil bearing formation containing water to facilitate the flow of oil which comprises introducting into the formation a hydrocarbon solution containing 0.05–5.0% of 1,3-diaminobutane.

References Cited in the file of this patent

UNITED STATES PATENTS

| | | |
|---|---|---|
| 2,331,594 | Blair | Oct. 12, 1943 |
| 2,779,418 | Garst | Jan. 29, 1957 |
| 2,800,962 | Garst | July 30, 1957 |